United States Patent [19]
Hartitz

[11] Patent Number: 5,194,471
[45] Date of Patent: Mar. 16, 1993

[54] RIGID CHLORINATED POLYVINYL CHLORIDE COMPOUND AND ARTICLES DERIVED THEREFROM

[75] Inventor: Joachim E. Hartitz, Avon Lake, Ohio

[73] Assignee: The B. F. Goodrich Company, Brecksville, Ohio

[21] Appl. No.: 656,538

[22] Filed: Feb. 15, 1991

[51] Int. Cl.$^5$ .............................................. C08K 5/58
[52] U.S. Cl. ...................................... 524/180; 525/84; 525/86
[58] Field of Search .................... 524/180; 525/84, 86

[56] References Cited

U.S. PATENT DOCUMENTS

| | | | |
|---|---|---|---|
| 3,453,347 | 7/1969 | Dreyfuss et al. | 260/897 |
| 3,541,185 | 11/1970 | Taima et al. | 525/84 |
| 3,642,948 | 2/1972 | Bauer et al. | 525/84 |
| 4,218,353 | 8/1980 | Kim | 260/28.5 D |
| 4,584,349 | 4/1986 | Lehr | 525/227 |
| 4,647,646 | 3/1987 | Hardy et al. | 528/45 |
| 4,710,533 | 12/1986 | Neuman | 524/394 |
| 4,983,687 | 4/1991 | Lawson | 525/356 |

FOREIGN PATENT DOCUMENTS

| | | |
|---|---|---|
| 626534 | 8/1961 | Canada . |
| 0646650 | 8/1981 | European Pat. Off. . |
| 2008674 | 1/1970 | France . |
| 1235403 | 6/1971 | United Kingdom . |

Primary Examiner—Paul J. Thibodeau
Assistant Examiner—D. S. Nakarani
Attorney, Agent, or Firm—Miles B. Dearth

[57] ABSTRACT

CPVC compositions, pipe, and a method of preparing a pipe are disclosed and comprise CPVC having 63% to 70% by weight chlorine and preferably 65% to about 69% chlorine; a high rubber impact modifier comprising a graft copolymer of a rubbery polydiene and one or preferably more than one hardening monomer selected from a group consisting of a vinyl aromatic monomer, a (meth)acrylate, and a (meth)acrylonitrile monomer including mixtures. Said graft copolymer exhibits a Shore D hardness of less than about 64, and preferably between about 35 and 45; and a chlorinated polyethylene containing between 30% and 40% chlorine by weight, compression molded placques derived from the powder composition exhibit a minimum tensile strength, modulus, izod impact strength, Tg and dynamic thermal stability specified herein. A pipe extruded directly from said composition meets ASTM-D2846 and exhibits unexpected ductility down to 20° F. (−6.6° C.) under fixed drop dart impact testing. The invention is useful for example in articles such as hot and cold water distribution system components installed in seasonal environments.

11 Claims, No Drawings

RIGID CHLORINATED POLYVINYL CHLORIDE COMPOUND AND ARTICLES DERIVED THEREFROM

FIELD OF THE INVENTION

The present invention relates to improved thermoplastic articles exhibiting an improved combination of properties. In particular, post-chlorinated polyvinyl chloride compounds are disclosed which exhibit as extrudate, a particular balance of strength, heat deflection temperature, low temperature ductility and stress rupture properties. As extruded profiles the compounds meet specified cell classification requirements under ASTM-D2846 for CPVC rigid thermoplastic compounds.

BACKGROUND OF THE INVENTION

Post chlorinated polyvinyl chloride (CPVC) excels in higher heat deflection temperature (HDT) compared to polyvinyl chloride and is a starting material for thermoplastic compounds for hot water pipes, and particularly pressure pipes, waste gas pipes, ducts, storage tanks, construction materials among other uses.

CPVC, in order to perform adequately for the intended use is generally formulated with impact modifiers, and flow enhancing additives among other ingredients to arrive at a balance of properties. Each additive chosen for one particular advantage often is accompanied by a corresponding undesired effect on another property. Antagonistic relationships have been observed between the following additives and properties:

| | | |
|---|---|---|
| impact modifiers | vs | melt flow rate |
| " | vs | heat deflection temperature |
| " | vs | tensile modulus |
| " | vs | dynamic thermal stability |
| " | vs | weathering |
| flow enhancers | vs | tensile modulus |
| " | vs | low temperature brittleness |
| " | vs | tensile strength |
| " | vs | heat deflection temperature |

Various attempts to overcome the observed limitations to modifications of CPVC are evident in the art. U.S. Pat. No. 3,299,182 discloses a blend of halogenated polyolefin and CPVC, in particular, chlorinated substantially linear polyethylene (CPE). The preferred CPE contains about 30% to 40% by weight chlorine, and is present at from about 2 to less than 10 parts by weight per 100 weight parts of CPVC (pbw), and preferably 5 to 8 parts. It has been observed that blends of CPE with CPVC do not meet the requirements of ASTM-D1784 under cell classification 2-3-4-4-7. The minimum requirements for meeting cell classification 2-3-4-4-7 under ASTM-D1784 for a CPVC composition are a notched izod impact strength of at least 1.5 ft·lbf per inch notch (80.1 J/m of notch), a tensile strength of at least 7,000 psi (48.25 MPa), a modulus of elasticity of at least 360,000 psi (2,481 MPa), a heat deflection temperature (HDT) under a 264 psi (1.82 MPa) load of at least 100° C. Specifically, CPE alone in combination with CPVC fails to meet tensile modulus and, izod impact per ASTM-D1784, long term hydrostatic design strength per ASTM-D2846, and a desired low temperature ductility.

U.S. Pat. No. 3,453,347 discloses impact strength improved CPVC on addition of amorphous rubbery polymerized alkylene monoepoxides and CPE. The particular oxirane monomers found to produce a rubbery amorphous polymer contain at least 3 consecutive carbons, for example butene-1-oxide. CPE is present at from 5 to about 10 parts and the polyepoxide is present at from about 0.25 parts to about 2.5 parts per hundred weight parts CPVC. The inherent viscosity of the parent PVC from which the chlorinated PVC is derived has a preferred level of greater than about 0.55. The blends disclosed are powder mixed and ready for injection molding.

CPVC powder compound which is in use today is required for high output extrusion processes. Higher output pounds per hour are attained with powder compound and under certain expertly operated, larger extrusion machines, output per hour has exceeded 900 lbs./hr. This narrower processing window places a high demand on a powder extrusion compound in terms of processibility. In the short amount of residence time and under high temperature and controlled shear, a powder compound must achieve complete fusion and resist decomposition in contact with surface temperatures which could otherwise break-down CPVC in a matter of minutes, rendering the fabricated article unsalable.

A high strength blend of CPVC and a styrene-acrylonitrile (SAN) copolymer is disclosed in U.S. Pat. No. 4,647,646. The blend exhibits preferably a single homogenous phase wherein the preferred embodiment consists essentially of CPVC having between 60.5% and 64.5% chlorine and styrene-co-acrylonitrile (SAN) containing between 18% and 24% acrylonitrile. The blend exhibits improved tensile strength, however a particularly high tensile strength in the absence of improved impact resistance and in particular, an absence of low temperature ductility is not useful for hot and cold water distribution system (HCWD) components such as plumbing pipes and fittings or in drain-waste-vent systems. A combination of properties is required. Upon impact modification of this blend, a loss in HDT and modulus is predicted.

An improved melt processible CPVC composition is disclosed in U.S. Pat. No. 4,584,349 ('349) comprising a CPVC polymer having chlorine content of between about 60% and 66% in combination with polymethylmethacrylate (PMMA). The blends exhibit a substantially single phase morphology and the glass transition temperature (Tg) of the blends was higher than the Tg for the CPVC and PMMA separately. Tg for amorphous polymers is highly correlated with HDT. In some applications, achieving a HDT higher than CPVC is desirable. Higher Tg and improved melt flow are achieved in '349, however compositions with high HDT and melt flow alone are not entirely acceptable for HCWD uses without additional properties, particularly, tensile strength, modulus, impact properties and low temperature properties. Attempts to balance all of the desired properties particularly for powder extrusion processing are met with sacrifices in at least one property such as HDT or tensile strength when pursuing improvements in another property. There is considerable art and less science demonstrated both for formulating a composition and in processing that composition to develop all required properties for improved HCWD compounds.

U.S. Pat. No. 4,710,533 ('533) discloses CPVC blends comprising a combination of a flow enhancing amount of alpha-methyl styrene polymers and/or alpha-methyl styrene-co-acrylonitrile, an impact modifier of ABS or MBS, lead stabilizer(s), acrylic processing aid and lubricant(s). The blends exhibit good thermal stability, impact strength and melt viscosity, however an HDT of no higher than 91.5° C. is achieved. HDT is a critical property for HCWD uses, however a minimum value of 100° C. is required for cell class 2-3-4-4-7. In addition, unacceptable low temperature impact performance and tensile modulus for the compositions of '533 would be expected. Addition of impact modifier might improve somewhat the impact strength but would not correct the deficiency in HDT.

Accordingly, it would be desirable to obtain a CPVC composition which meets cell class 2-3-4-4-7 higher, and a pipe derived therefrom exhibiting a minimum 180° F. (82.2° C.) hydrostatic design stress of 500 psi (3.5 MPa) or higher per ASTM-D2846 and has improved low temperature ductility. Such a composition and article derived therefrom which exhibits this desired combination of properties not been heretofore disclosed and represents a long felt need in the art pertaining to HCWD components. With regard to this balance of properties it would be preferable, moreover a practical necessity, for achieving this combination in an extruded or molded article directly from a powder compound. The compound must also exhibit adequate dynamic thermal stability for use in commercial extrusion and injection molding processes.

SUMMARY OF THE INVENTION

It is therefore one aspect of the present invention to provide a thermoplastic composition preferably in powder form, and comprising a specified major proportion of CPVC, a specified minor proportion of impact modifier, a flow enhancing component along with specified minor amounts of stabilizer(s), lubricant(s) and other optional additives, wherein said composition exhibits a specified performane level in several properties simultaneously in the fused state and heretofore unachieved.

It is a specific aspect of the present invention to provide a composition, preferably in particulate form comprising a major proportion of CPVC specified herein, a minor proportion of a graft copolymer comprising a rubbery polydiene polymer and one or more hardening monomers, said hardening monomers are selected from the group consisting of vinyl aromatic monomers, (meth)acrylate monomers, (meth)acrylonitrile monomers and mixtures thereof; and a chlorinated polyolefin specified herein. Said composition, in a fused state, exhibits a combination of properties wherein CPVC is the continuous phase. Said combination in a fused state exhibits a tensile strength minimum value, a minimum tensile modulus, a minimum heat deflection temperature, a minimum izod impact strenth, low temperature ductility and dynamic thermal stability.

A ¾ inch (19 mm) standard dimension ratio 11 (SDR-11), copper tube size (cts) pipe extruded directly from a powder composition exhibited an unexpected ductility during low temperature drop impact testing and exceeded the minimum long term hydrostatic stress rupture requirement of ASTM-D2846. The term parts used throughout this specification refers to parts by weight per 100 parts by weight CPVC.

These aspects are obtained by the composition of the present invention comprising CPVC having a specified chlorine content and derived from a PVC resin having a specified Inherent Viscosity range (I.V.) in combination with from about 1 to about 5 pbw of a chlorinated polyethylene specified hereinbelow, from about 5 to about 15 weight parts of an impact modifier selected from at least one of the group consisting of an ABS graft copolymer having a Shore D hardness generally less than about 64 and preferably in a range between about 35 and 45 and non-ABS graft copolymer having a Shore D hardness between 35 and less than 42. The composition further comprises from 0 to about 20 pbw combined of one or more components selected from the group consisting of lubricants, processing aids, pigments, colorants, stabilizers, co-stabilizers, and plasticizer, and flame retardants.

DETAILED DESCRIPTION OF THE INVENTION

CPVC referred to in this specification means chlorinated polyvinyl chloride having a specified weight percent (wt %) of chlorine between about 63% and about 70%, and preferably between about 65% and 69%. Where the chlorine content is outside of the specified range, CPVC exhibits characteristics which render it unsuitable in the present invention. Above the maximum specified chlorine level, the compositions derived therefrom would exhibit inadequate processing properties, poor impact properties and inadequate dynamic thermal stability for the intended use.

There are considerations pertaining to the precursor PVC polymer from which is derived the post chlorinated PVC employed in this invention. The molecular weight of PVC as indicated by inherent viscosity measurement per ASTM-D1243 generally can range from about 0.2 to about 2.0 at the extremes. Preferably, the I.V. of precursor PVC employed falls within a range of from about 0.4 to about 1.6 with the most preferred range of 0.7 to about 1.2. In the examples below the CPVC employed was derived from a precursor homo-PVC having an I.V. of about 0.9.

CPVC is known to the art and to the literature and is commercially available. The preferred polymerization method for preparing the precursor PVC is the aqueous suspension method. Details of this method are beyond the scope of this invention and need not be disclosed as suspension PVC processes are the predominant method used in the art. CPVC can be made according to any commercial chlorination process or the like such as by a solution process, a fluidized bed process, a preferred water slurry process, a thermal process, or a liquid chlorine process. Inasmuch as chlorination processes for preparing CPVC resins are established and CPVC is readily available in the art, they will not be discussed in great detail herein. Rather, reference is hereby made to the several CPVC patents set forth in the background art, e.g. U.S. Pat. Nos. 2,996,049; 3,100,762; etc., which are hereby fully incorporated by reference with regard to the preparation of CPVC.

The CPVC resins utilized in the present invention generally have a density of from about 1.45 to about 1.67 grams/cc at 25° C. and a preferred glass transition temperature (Tg) between about 110° C. and about 150° C., as measured by a differential scanning calorimeter (DSC). Tg is recorded generally as the midpoint or inflection point of the DSC curve in the temperature range at which the material undergoes the transition from the glassy state. The most preferred CPVC resin has a density in the range of from about 1.51 to about 1.58 grams/cc at 25° C. and a glass transition temperature between about 120° C. and 140° C.

CPVC referred to in this specification is generally derived from a PVC homopolymer. CPVC, also within the purview of the present invention may be derived from a PVC copolymer having up to 5 parts of comonomer per 100 parts by weight of vinyl chloride monomer. For example, vinyl chloride can advantageously be polymerized in the presence of a chain terminating coreactant such as a solvent, an ethylenic unsaturated alkylene such as an alpha olefin or a reactive mercaptan such as 2-mercapto ethanol. Where the preursor PVC contains less than about 5 parts total of one or more comonomers per 100 parts of vinyl chloride, this polymer is described in the term of art as a homopolymer. Therefore the CPVC derived therefrom carries the same meaning in the term of art context.

According to the present invention, CPVC can be blended with or contain generally small amounts of PVC and/or PVC copolymers. The amount of PVC homopolymer or copolymer can be up to about 25 percent by weight, desirably up to about 10 percent by weight, and preferably nonexistent based upon 100 parts by weight of CPVC.

Copolymers of vinyl chloride and comonomer(s) are known to the art and can be post-chlorinated. The vinyl chloride copolymer may contain up to about 30 parts of comonomer based upon 100 weight parts of the vinyl chloride, and preferably less than about 20 parts of comonomer. The copolymer can comprise a minor amount of a third monomer. Copolymers include vinyl chloride copolymerized with esters of (meth)acrylic acid wherein the ester portion has from 1 to 12 carbon atoms, for example, methyl acrylate, ethyl acrylate, butyl acrylate, octyl acrylate, cyanoethyl acrylate, methyl methacrylate, ethyl methacrylate, butyl methacrylate, and the like; vinyl ($C_2$–$C_8$) esters, for example vinyl acetate, -propionate, -butyrate and the like; acrylonitrile, and methacrylonitrile; styrene derivatives having a total of from 8 to 15 carbon atoms such as alphamethylstyrene, vinyl toluene, chlorostyrene; vinyl naphthalene; diolefins having a total of from 4 to 8 carbon atoms such as isoprene, and including halogenated olefins such as chlorobutadiene; monoolefins having from 2 to 10 carbon atoms such as ethylene, propylene, and butylene, with isobutylene being preferred. The preferred CPVC is derived from homopolymer PVC.

It is further contemplated in the present invention that CPVC can be blended with a CPVC copolymer. The amount of the CPVC copolymer can be up to about 30 parts per 100 weight parts of a CPVC homopolymer, and is preferably absent.

The high rubber graft copolymers referred to in this specification are graft copolymers prepared by graft-polymerizing less than about 50 wt % of at least one rigid monomer such as a vinyl aromatic monomer, an acrylic monomer, a vinyl nitrile monomer or a mixture thereof in the presence of more than about 50 wt % of a pre-formed rubbery polydiene substrate such as a 1,3-diene polymer or copolymer thereof. In particular, the graft copolymers comprise from 50 to 90 wt % of a rubbery substrate polydiene such as for example polybutadiene or polyisoprene, or a copolymer of a 1,3-diene with less than about 50 wt % of a copolymerizable vinyl or vinylidene monomer such as for example an olefin, a styrene monomer, a (meth)acrylate ester monomer, or a (meth)acrylonitrile monomer, and from 10 to 50 wt % of a rigid graft phase formed from at least one rigid vinylidene or vinyl monomer selected from the group consisting of vinyl aromatic monomers, (meth)acrylic monomers, vinyl nitrile monomers and mixtures thereof. A rigid monomer is a hardening monomer and for the purposes of this invention means a polymerizable vinyl or vinylidene monomer that when homopolymerized would exhibit a glass transition temperature greater than 20° C. The term rubbery substrate or rubbery copolymer means, as is conventionally recognized, a polymer having a rubbery or elastomeric character including a glass transition temperature generally below 0° C. and preferredly below about −70° C. The rubbery polymer can contain a polydiene which is partially hydrogenated.

In the preparation of high rubber graft copolymers, either or both the rubbery or the rigid graft component may further include minor amounts, less than about 5 wt %, of a copolymerizable crossinking monomer(s) such as a di-or tri-functional monomer or combination to increase graft linking and/or cross-linking of either or both components. Preferably, crosslinking monomer(s) are absent. The high rubber graft copolymers may be prepared by any of the variety of conventional polymerization processes including emulsion, suspension, sequential emulsion-suspension, bulk and solution polymerization processes. These methods are known in the polymerization art specifically directed toward the preparation of a wide variety of high rubber graft copolymers for impact modification of thermoplastic resins. Suitable specific embodiments of the particular impact modifiers can be prepared by any of the aforementioned polymerization means. The preferred polymerization processes are in aqueous media and include emulsion and suspension methods. The preferred process for preparing the rubbery portion is by way of emulsion polymerization as taught in the art.

An exemplary high rubber graft copolymer composition includes the class of high rubber ABS graft copolymer resins, which may generally be described as graft copolymers of styrene and acrylonitrile on butadiene containing rubbers. Other high rubber graft copolymers include non-ABS polydiene rubber containing graft copolymers including methylmethacrylate-styrene-acrylonitrile grafted on polybutadiene or styrene-butadiene rubbers (MABS resins), and graft copolymers of methylmethacrylate and styrene grafted on polybutadiene or styrene-butadiene rubbers (MBS resins).

It has been observed that only specific high rubber graft copolymers are suitable in this invention within the wide variety available in the art. Moreover with the use of these specific types, the desired combination of properties can only be achieved by utilizing the chosen impact modifier in an amount within a specific range. The particular high rubber graft copolymer found to impart unexpected ductility behavior under low temperature fixed drop dart impact testing is a high rubber ABS graft copolymer (most preferred) having a Shore D hardness less than about 64, preferably less than 50 and most preferably in a range between about 35 and 45 and a non-ABS polydiene rubber containing graft copolymer, preferably a MBS type having a Shore D hardness of from 35 to less than 42. The specific range of amount in terms of parts by weight (pbw) of said suitable high rubber graft copolymer employed in the CPVC composition can range from about 5 pbw to about 15 pbw and interdepends in part, on the particular CPVC chosen. A high I.V. PVC which is chlorinated to a level at the bottom of the specified range herein may enable achieving the desired combination of properties at the lower end of the specified impact modifier amount. Conversely, a lower I.V. PVC which is chlorinated to a level at the high end of the specified range may require a correspondingly higher amount of high rubber impact modifier within the range herein specified. In the preferred practice of employing the preferred CPVC in which the I.V. of the precursor PVC ranges from about 0.7 to about 1.2 and wherein the chlorine level is between about 67 wt % to about 69% chlorine, the preferred amount of said impact modifier present can vary from about 5 pbw to about 10 pbw. The teachings herein are sufficient for the practioner to reduce the invention to practice in a reasonable trial and error approach employing variations in amounts as well as the choice of component characteristics within the specified ranges for those characteristics.

The postchlorinated polyethylene (CPE) for use in the blends of this invention is a rubbery material resulting from the chlorination of a polyethylene having a substantially linear structure, a density (ASTM-D1505-57T) of from about 0.91 to about 0.98 gram/cc. at 25° C., a melting point usually in the range of from about 100° C. to 130° C.; and a melt index (according to ASTM-D1238-57T) in the range above about 0.05, more preferably in the range from about 0.05 to about 20. A good method of preparing such a CPE material is more fully described in U.S. Pat. No. 3,299,182. Suitable embodiments are commercially available.

CPE materials generally contain from about 5% to about 50% wt. of combined chlorine, however those containing from about 30% to about 40% wt. of combined chlorine, and most preferably from about 32% to about 38% chlorine, are suitable for use in the present invention. In the examples herinbelow, a CPE containing about 36% chlorine was employed. The amount of CPE present can range from about 1 pbw to about 10 pbw, and is dependant in part on the particular CPVC chosen relative to the aforementioned molecular weight and chlorine levels. Within the preferred range of CPVC characteristics discussed, it is preferred to utilize CPE at from about 1 pbw to about 5 pbw, and most preferably between 1 and 3 pbw.

It is expected that other components may be advantageously included in the compounds of the present invention. When employed, these can include compounds from the group consisting of lubricants, stabilizers, tinting colorants, plasticizers, blueing agents, pigments, Tg enhancing additive(s) and processing aids all of which are established compounding ingredients and serve various purposes known in the PVC compounding art. Exemplary lubricants are polyglycerols of di- and trioleates, polyolefins such as polyethylene, polypropylene and oxidized polyolefin and high molecular weight paraffin. In the examples 2.2 parts of polyethylene and oxidized polyolefin were used. Preferred are mixtures of $C_2$ polyolefin and oxidate and are employed at levels generally ranging from about 1 part to about 3 parts combined. Exemplary heat stabilizing ingredients employable herewith are referred to in the art as alkyltin compounds such as methyltin, butyltin, octyltin, mixed metal alkyltins, dialkyl tin di-carboxylates, methyltin mercaptides, butyltin mercaptides used in the examples at 2.4 parts, octyltin mercaptides, dialkyl tin bis(alkylmercaptocarboxylate) including di-n-octyltin-S,S'-bis-(isooctyl mercaptoacetate), butylthiostannoic acid, and other ester tins. Di-lower alkyl tin stabilizers such as $C_4$ to $C_8$ alkyl tin mercaptides are preferred. Stabilizer(s) are generally present at from about 0.05 pbw to about 3 pbw.

Exemplary processing aids are acrylic polymers such as poly methylacrylate. Other processing aids are disclosed in *The Plastics and Rubber Institute: International Conference on PVC Processing*, Apr. 26–28 (1983), Paper No. 17. Processing aids are preferably absent.

Exemplary pigments such as calcium carbonate, carbon black, talc, clay, mica, and preferably titanium dioxide can be included. Titanium dioxide was used at 5 pbw in the examples below. Pigment is present if at all generally at from about 0.5 parts to about 20 parts, and preferably from about 0.5 parts to about 6 parts.

Specific examples of plasticizers include derivatives of carboxylic acid esters including the various derivatives of adipic acid, azelaic acid, phthalic acid, benzoic acid, and citric acid, isobutyric acid, isophthalic acid derivatives, sebacic acid derivatives, isosebacic acid derivatives, stearic acid, tartaric acid, oleic acid, succinic acid; phosphoric acid derivatives, derivatives of terephthalates, pentaerythritol, trimellitic acid, and mixtures. Other plasticizers can be included for example, partial esters of the above carboxylic acids, ethers, glycol derivatives, glycolates, glycerol derivatives, are set forth in *The Technology of Plasticizers*, by Sears and Darby, pages 893–1085, John Wiley & Sons, New York, 1982, which is hereby fully incorporated by reference. Plasticizers are preferredly absent.

Optional exemplary Tg enhancing additives include SAN polymers, PMMA, the polyimides such as polyglutarimide, polymaleimide, polyitaconimide, and are commercially available. Examples of the preparation of certain polyimides are described by Kopchik, U.S. Pat. No. 4,246,374, and Schröder, et al. U.S. Pat. No. 3,284,425. The polyimides include imide methacrylate copolymers and/or polyaliphatic imide copolymers. The polyimide copolymers are manufactured and sold by the Rohm and Haas Company under the trade names of Paraloid ® HT-510, Paraloid ® EXL-4151, Paraloid ® EXL-4171, Paraloid ® EXL-4241 and Paraloid ® EXL-4261. Tg enhancing additives are preferably absent.

The components are generally combined and mixed with powder mixing equipment such as a Henschel mixer, or ribbon blender and can be cubed or preferably left in powder form. Alternatively less than all of the components can be combined first, with the remaining component(s) combined in a multiple screw extruder. The powder composition of the present invention is generally processed in conventional extrusion machinery such as a twin screw extruder or a single screw extruder or other processing means including injection molding for example of pipe coupling components among the myriad useful articles. The thermoplastic powder compositions are processed at conventional melt temperatures from about 175° C. to about 235° C., and preferably from about 200° C. to about 225° C. for CPVC.

An extruder generally has a conveying means such as a hopper through which the material is charged, an intermediate screw processing portion, and a final die through which the material is discharged in the form of an extrudate. It is further advantageous to use low friction sizing such as gauging discs or vacuum sizing sleeves. The multi-screw extruder is widely used for extrusion of pipe. There are two types of multi-screw extruders: counter-rotating screws and co-rotating screws. Conical twin screw, four screw and parallel twin screws in use are preferably counter-rotating multi-screw extruders. They are generally gravity or meter fed. The co-rotating screws can be used as compounding machines and sometimes for extrusion of pipe. In most cases, output rates are dependent upon the extruder size, drive power and screw design. The machine characteristics applicable to melt process the composition of the present invention include:

Head pressure rating of at least 7500 psi (51.7 MPa).
Extruder drive/gearbox capable of generating high torque at low rpm.
Vacuum venting to remove volatiles, moisture and entrapped air.
A barrel L/D of at least 16/1.
Temperature controllers able to control within 5° F. or better.
Accurately controllable powder metering screw.

EXAMPLES

The following standard testing methods referred to here apply to the distinguished properties of the subject invention:

| Property | Standard |
| --- | --- |
| Tensile Strength | ASTM-D638 |
| Tensile Modulus | ASTM-D638 |
| Notched Izod Impact | ASTM-D256 |
| Heat Deflection Temp. | ASTM-D648 |
| Drop Impact Strength | ASTM-D2444 |
| Hydrostatic Strength | ASTM-D1598 |
| Inherent Viscosity | ASTM-D1243 |
| Shore Hardness | ASTM-D530 |
| Specific Gravity | ASTM-D792 |

The compositions in the examples were also evaluated for processing stability. A primary commercial measure of the relative thermal stability and processability of CPVC compounds is the "dynamic thermal stability" (DTS) test. This test is designed to measure the time-torque relationship at selected temperatures using an instrument such as the Brabender Plasticorder. The test value generally reported, and used for comparison, is the "DTS time". DTS time is usually defined as the time required for the instrument torque to fall to its minimum value, with the polymer compound in the melted state, before beginning to increase, presumably due to instability and usually accompanied by autogenous cross-linking. DTS time is dependent not only on polymer properties, but also on temperature, sample size, stabilizers, lubricants, instrument operating conditions, degree of instrument maintenance, and other conditions which are controlled for accurate comparison between different compounds. A DTS time of lower than about 16 minutes is generally undesirable and preferably DTS time is equal to or higher than about 18 minutes. Where temperature is not specified below, the temperature is presumed to be room temperature.

EXAMPLE 1

Nine parts of ABS graft copolymer with a Shore D hardness of 44 were combined in a powder mixer with one hundred parts of CPVC containing 68.5% chlorine, and pigment, stabilizer and lubricants outlined above. The composition was fused on a two roll mill, and compression molded into plaques. The compression molded plaques were tested for heat deflection temperature, tensile strength, tensile modulus, and izod impact strength. The heat deflection temperature was 101° C., tensile strength was 7,745 psi (53.39 MPa), the tensile modulus was 342,200 psi (2,359 MPa and the izod impact was 9.5 ft·lbf per inch notch (507.1 J/m of notch). The powder composition was conveyed to a CM 55 conical twin screw extruder and extruded into a ¾ inch (19 mm) SDR-11 cts tubing (ASTM-D2846) and tested for fixed energy drop impact at several temperatures to observe the presence of ductility. In particular, drop impact was measured at 40° F. (4.4° C.), 30° F. (−1.1° C.), and 20° F. (−6.6° C.). Long term hydrostatic stress rupture (LTHS) testing was also conducted. LTHS testing was conducted for each example over a period of between about 190 hours and about 600 hours at 180° F. (82.2° C.) to predict the 100,000 hour intercept value. This value is the estimated tensile stress in the wall of a pipe in the circumferential orientation that when applied continuously will cause failure of the pipe at 100,000 hours. The minimum LTHS at 180° F. (82.2° C.) required under ASTM-D2846 is 1000 psi (7.0 MPa). The hydrostatic design stress is LTHS multiplied by a safety factor of 0.5. Therefore a test pipe exhibiting a LTHS of 1000 psi (7.0 MPa) has a hydrostatic design stress of 500 psi (3.5 MPa). Percent scatter was also reported. Under ASTM-D2846 there is a maximum specified reliability which is expressed as percent scatter, and under this specification a scatter of 15% is the maximum acceptable. An extruded ¾ inch (19 mm) SDR-11 cts tubing derived from the composition of Example 1 exhibited a drop impact 43.9 ft·lbf (59.5 N-m). At 40° F. (4.4° C.) and 12 ft·lbs. (16.25 N-m) of energy, there were 10 passes in 10 trial and at 15 ft·lbs.(20.32 N-m), 10 passes in 10 trials. At 30° F. (−1.1° C.) and 12 ft·lbs.(16.25 N-m) of energy, the ductility was 10 passes in 10 trials and at 15 ft·lbs.(20.32 N-m), 10 passes in 10 trials. At 20° F. (−6.6° C.) and 12 ft·lbs.(16.25 N-m), there were 9 passes out of 10 trials and at 15 ft·lbs.(20.32 N-m) 4 passes out of 10 trials. The 100,000 hr. intercept LTHS was 1,279 psi (8.817 MPa) and a percent scatter of 5.9 percent. The powder composition of Example 1 exhibited a Brabender DTS of 16 minutes. This composition does not meet all of the requirements for ASTM-D1784, in particular, the tensile modulus minimum.

EXAMPLE 2

One hundred parts of CPVC of Example 1 was combined in a powder mixer with seven parts of an ABS impact modifier of Example 1, pigment, lubricant and stabilizer as in the previous example. The powder composition was fused on a two roll mill, and compression molded. Compression molded plaques of Example 2 exhibited a heat deflection temperature of 100° C., tensile strength of 8,088 psi (5.575 MPa), a tensile modulus of 390,800 psi (2,694 MPa) and an izod impact of 5.4 ft·lbf per inch notch (288.2 J/m of notch). The powder composition was extruded into a pipe as in the previous example and exhibited a drop impact of 34.9 ft·lbs.(47.3 N-m). The ductility at 40° F. (4.4° C.) and 12 ft·lbs.(16.25 N-m) of energy was 10 passes in 10 trials, and at 15 ft·lbs.(20.32 N-m) there were 9 passes in 10 trials. At 30° F. (−1.1° C.) and 12 ft·lbs.(16.25 N-m) of energy, there were 6 passes in 10 trials and at 15 ft·lbs.(20.32 N-m) there were 8 passes in 10 trials. At 20° F. (−6.6° C.) and 12 ft·lbs.(16.25 N-m) of energy, there were 4 passes in 10 trials and at 15 ft·lbs.(20.32 N-m) there were no passes in 10 trials. The 100,000 hr. intercept LTHS was 1,365 psi (94.10 MPa) and a percent scatter of 4.5 percent. The powder composition of Example 2 exhibited a Brabender of DTS of 21 minutes, and meets the requirements of ASTM-D1784, however this composition exhibited poor processing characteristics and is not suitable for extrusion of pipe.

EXAMPLE 3

One hundred parts of the CPVC of Example 1 was combined in a powder mixer with nine parts of a chlorinated polyethylene outlined above, pigment, lubricant and stabilizer as in the previous examples. The powder composition was fused on a two roll mill and pressed into plaques as in the previous examples. Fused press plaques of Example 3 exhibited a heat deflection temperature of 100° C., a tensile strength of 7,956 psi (54.84 MPa), a tensile modulus of 346,000 psi (2,385 MPa) and an izod impact of 1.9 ft·lbf per inch notch (101.4 J/m of notch). The powder composition was extruded as in the previous example into a pipe and tested for drop impact, which was 21.1 ft·lbs. (28.6 N-m). The pipe exhibited a ductility at 40° F. (4.4° C.) and 12 ft·lbs. (16.25 N-m) of energy in 4 passes out of 10 trials and at 15 ft·lbs. (20.32 N-m) there were 4 passes out of 10 trials. At 30° F. (−1.1° C.) and 12 ft·lbs. (16.25 N-m) of energy, there were no passes in 10 trials and at 15 ft·lbs. (20.32 N-m) there waere no passes in 10 trials. There were no passes at 20° F. (−6.6° C.). The 100,000 hr. intercept LTHS was 161 psi (1.109 MPa) and the percent scatter was 17.4 percent. The powder composition of Example 3 exhibited a Brabender DTS of 24 minutes, and the cts tubing derived does not meet the requirements of ASTM-2846.

EXAMPLE 4

One hundred parts of CPVC as in previous Examples were combined in a powder mixer with two parts of chlorinated polyethylene, pigment, lubricant and stabilizer as in the previous examples. The powder composition was fused on a two roll mill and compression molded into plaques for testing of the following properties. The fused composition of Example 4 exhibited a heat deflection temperature of 101° C., a tensile strength of 8678 psi (59.82 MPa), and a tensile modulus of 393,000 psi (2,709 MPa). The izod impact was 0.7 ft·lbf per inch notch (37.36 J/m of notch). The powder composition of Example 4 was extruded into a pipe as before for testing of the following properties. The drop impact value was 5 ft·lbs. (6.7 N-m) and the ductility at 40° F. (4.4° C.) and 12 ft·lbs. (16.25 N-m) was 0 passes in 10 trials and 0 passes in 10 trials at 15 ft·lbs. (20.32 N-m). There were no drop impact passes for the pipe derived in Example 4 at 30° F. (−1.1° C.) nor at 20° F. (−6.6° C.). The 100,000 hr. intercept long term hydrostatic strength was 535 psi (3.688 MPa) and scatter of 17.1 percent. The powder composition of Example 4 exhibited a Brabender dynamic thermal stability 27 minutes, however a ¾ inch (19 mm) SDR-11 cts tubing derived therefrom fails to meet the requirements of ASTM-D2846.

EXAMPLE 5

Two parts of the chlorinated polyethylene were combined in a powder mixer with one hundred parts CPVC as in the previous Examples and included 7 parts of a methacrylate butadiene styrene (MBS) impact modifier having a Shore D hardness of 42, pigment, lubricant and stabilizer as the previous example. The composition was fused on a two roll mill and compression molded into plaques for testing of the following properties. Fused plaques of the composition of Example 5 exhibited a heat deflection temperature of 99° C., a tensile strength of 8,089 psi (55.76 MPa), a tensile modulus of 360,600 psi (2,485 MPa), and an izod impact of 7.7 ft·lbf per inch notch (411 J/m of notch). The powder composition of Example 5 was fed into an extruder, extruder, into an SDR-11 pipe as before and tested for the following properties. The extruded pipe exhibited a drop impact of 39.7 ft·lbs. (53.7 N-m). At 40° F. (4.4° C.) and a energy of 12 ft·lbs. (16.25 N-m) the pipe exhibited a fixed drop impact ductility of 9 passes in 10 trials and at 15 ft·lbs. (20.32 N-m) energy it exhibited a ductility of 10 passes in 10 trials. There were at 30° F. (−1.1° C.) and 12 ft·lbs. (16.25 N-m) 10 passes in 10 trails and at 15 ft·lbs. (20.32 N-m) of energy the ductility was also 10 passes in 10 trials. At 20° F. (−6.6° C.) and a energy of 12 ft·lbs. (16.25 N-m) the ductility was 7 passes in 10 trials and at 15 ft·lbs. (20.32 N-m) of energy the ductility was 0 passes in 10 trials. The 100,000 hr. intercept long term hydrostatic strength for the pipe derived from the composition of Example 5 was 1,170 psi (8.06 MPa) and a percent scatter of 4.9 percent. The powder composition of Example 5 exhibited a Brabender dynamic thermal stability of 22.6 minutes, and did not meet the minimum HDT requirements of ASTM-D2846.

EXAMPLE 6

Composition of Example 6 contained a combination of the CPVC used in Example 1 combined in a powder mixer with two parts of a chlorinated polyethylene, seven parts of an ABS impact modifier having a Shore D hardness of 64, pigment, lubricant, and stabilizer as in the previous examples with mixing until a uniform composition was achieved. The composition was fused on a two roll mill and compression molded for testing for the properties below. The fused, pressed plaques of Example 6 exhibited a heat deflection temperature of 100° C., a tensile strength of 8,352 psi (57.57 MPa), a tensile modulus of 450,300 psi (3,104 MPa), and an izod impact strength of 2.0 ft·lbf per inch notch (106.7 J/m of notch). The powder composition of Example 6 was fed to an extruder and extruded into pipe wherein the pipe was tested for drop impact, low temperature fixed drop impact failure, and long term hydrostatic strength. An extruded pipe derived from Example 6 composition exhibited a drop impact of 36.0 ft·lbs.(48.7 N-m) and a ductility at 40° F. (4.4° C.) and 12 ft·lbs.(16.25 N-m) of 6 ductile passes in 10 trials, and at 15 ft·lbs.(20.32 N-m) at 40° F. (4.4° C.) 5 passes in 10 trials. At 30° F. (−1.1° C.) and 12 ft·lbs.(16.25 N-m) the pipe exhibited 6 passes in 10 trials, and at 15 ft·lbs.(20.32 N-m) 2 passes in 10 trails. At 20° F. (−6.6° C.) and a energy of 12 ft·lbs.(16.25 N-m) the pipe of composition 6 exhibited 1 pass in 10 trials and at 15 ft·lbs.(20.32 N-m) the pipe did not pass in any incidents in 10 trials. The 100,000 hr. intercept long term hydrostatic stress rupture value obtained from the pipe of Example 6 was 1,306 psi (9.003 MPa) and a 10.4 percent scatter. The powder composition of Example 6 exhibited a marginal Brabender dynamic thermal stability time of 16 minutes, meets the requirements of ASTM-D1784 for cell class 2-3-4-4-7.

EXAMPLE 7

In this example 100 parts of a CPVC as in the previous examples were combined in a powder mixer with two parts of a chlorinated polyethylene outlined above, and seven parts of the high rubber ABS graft copolymer of Example 1, pigment, lubricant and stabilizer as in the previous examples until a uniformed dry powder composition was obtained. The compression molded composition of this example exhibited a heat deflection temperature of 101° C., a tensile strength of 7,997 psi (55.13 MPa), a tensile modulus of 363,500 psi (2,505 MPa), and izod impact strength of 7.7 ft·lbf per inch notch (411 J/m of notch). Extruded pipe of the composition exhibited a drop impact of 41 ft·lbs (55.5 N-m) and exhibited a ductility at 12 ft·lbs.(16.25 N-m) and 40° F. (4.4° C.) of 9 passes in 10 trials, and at 15 ft·lbs.(20.32 N-m) and 40° F. (4.4° C.), 8 passes in 10 trials. At 30° F. (−1.1° C.) and 12 ft-lbs. (16.25 N-m) there were 9 passes out of 10 trials, and at 15 ft·lbs.(20.32 N-m) there were 7 passes out of 10 trials. At 20° F. (−6.6° C.) and 12 ft·lbs.(16.25 N-m) there were 9 passes in 10 trials and at 15 ft·lbs.(20.32 N-m) there were 3 in 10 trials. The 100,000 hr. intercept long term hydrostatic stress rupture was rated at 1,242 psi (8.562 MPa) and a percent scatter of 11.2 percent. The powder compound exhibited a Brabender dynamic thermal stability of 18 minutes. In a fused state the composition of Example 7 passes the performance requirement of ASTM-D1784 for cell class 2-4-4-4-7, and exhibited satisfactory ductility under fixed drop dart impact testing at 20° F. (−6.6° C.).

It is noted from the following examples by comparison that the compositions of Examples 1, 2, 5, 6, and 7 exhibit desired properties, i.e. heat deflection temperature, tensile strength, modulus, izod impact strength, and drop impact strength. Example 1 fails under ASTM-D1784, has inadequate DTS, and is not processible for extruding pipe. Example 2 passes ASTM-D1784. but has inadequate 20° F. fixed drop impact ductility and unacceptable processibility properties. Example 5 did not pass the requirements of ASTM-D1784 and did not exhibit adequate low temperature ductility. Example 6 has marginal processibility, meets the requirements under ASTM-D1784 cell class 2-3-4-4-7 and exhibits ductility at 20° F. (−6.6° C.) but somewhat less than the most preferred embodiment in example 7. The composition of Example 7 is processible, meets ASTM-D2846, and develops as an extrudate, derived directly from a powder composition, acceptable 20° F. (−6.6° C.) fixed drop impact ductility and is the best mode of the invention as directed specifically to a molded article.

Various changes and modifications may be made in carrying out the present without departing from the spirit and scope thereof. These changes are to be considered as part of the invention. While in accordance with the Patent Statutes, the best mode and preferred embodiment has been set forth. The scope of the invention is not limited thereto, but rather by the scope of the attached claims.

What is claimed is:

1. A composition, comprising: chlorinated polyvinyl chloride containing from about 63% by weight to about 70% by weight chlorine, said chlorinated polyvinyl chloride polymer is derived from a polyvinyl chloride polymer having an inherent viscosity between about 0.4 and about 1.6, from about 5 to about 15 weight parts per 100 weight parts of chlorinated polyvinyl chloride, a graft copolymer containing more than 50 weight percent of a polydiene and one or more hardening monomers, said graft copolymer selected from at least one of the group consisting of a ABS graft copolymer having a Shore D hardness of from 35 to less than 64, and a non-ABS polydiene containing graft copolymer having a Shore D hardness of from 35 to less than 42; from about 1 to about 5 weight parts per 100 weight parts of chlorinated polyvinyl chloride of a chlorinated polyethylene containing from about 5% to about 50% by weight chlorine, and a stabilizer for said chlorinated polyvinyl chloride.

2. The composition of claim 1 wherein said graft copolymer contains a graft polymer of a polydiene rubber and hardening monomer(s) selected from the group consisting of vinyl aromatic, (meth)acrylate, (meth)acrylonitrile and mixtures.

3. The composition of claim 1 wherein said graft copolymer is derived from a 1,3-diene polymer or copolymer, a vinyl aromatic monomer and a (meth)acrylonitrile monomer, said graft copolymer having a Shore D hardness between about 35 and about 45.

4. The composition of claim 1 wherein said graft copolymer is a MBS graft polymer having a Shore D hardness from about 35 to less than 42.

5. The composition of claim 1 wherein said polyvinyl chloride polymer has an inherent viscosity of from about 0.7 to about 1.2 and said chlorinated polyvinyl chloride contains from about 65% to about 69% by weight chlorine.

6. The composition of claim 5 wherein said at least one stabilizer is a tin stabilizer.

7. The composition of claim 3 wherein said graft copolymer is present at from about 5 to about 10 parts by weight per 100 weight parts of chlorinated polyvinyl chloride.

8. The composition of claim 7 wherein said chlorinated polyethylene is present at from about 1 to about 3 pbw.

9. The composition of claim 8 in a fused state which meets or exceeds the minimum requirements of ASTM-D2846 and exhibits ductility under fixed drop dart impact testing at 20° F. (−6.6° C.) and at least 12 ft·lbf (16.25 N-m).

10. The composition of claim 6 further comprising a pigment, a polyolefin and oxidized, wherein a compression molded plaque of said composition exhibits a tensile strength of at least 7,000 psi (4.825 MPa), a modulus of elasticity of at least 360,000 psi (2,481 MPa), an izod impact strength greater than about 1.5 ft·lbf per inch notch (80.1 J/m of notch) per inch of notch.

11. The composition of claim 10 exhibiting a notched Izod impact of at least 5.0 ft·lbf per inch notch (266.9 J/m of notch).

* * * * *

UNITED STATES PATENT AND TRADEMARK OFFICE
CERTIFICATE OF CORRECTION

PATENT NO. : 5,194,471
DATED : March 16, 1993
INVENTOR(S) : Joachim E. Hartitz

It is certified that error appears in the above-indentified patent and that said Letters Patent is hereby corrected as shown below:

In column 14, line 51, after the phrase "a polyolefin and oxidized" insert the word --polyolefin--.

Signed and Sealed this

Fourteenth Day of December, 1993

*Attest:*

BRUCE LEHMAN

*Attesting Officer*   Commissioner of Patents and Trademarks